United States Patent
Matsen et al.

(10) Patent No.: US 8,017,059 B2
(45) Date of Patent: Sep. 13, 2011

(54) COMPOSITE FABRICATION APPARATUS AND METHOD

(75) Inventors: Marc R. Matsen, Seattle, WA (US); Kim E. Peterson, Bellevue, WA (US); William Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 11/854,733

(22) Filed: Sep. 13, 2007

(65) Prior Publication Data

US 2009/0071217 A1    Mar. 19, 2009

(51) Int. Cl.
*B29C 35/12*    (2006.01)

(52) U.S. Cl. .......... 264/403; 264/319; 264/258; 249/78; 249/79

(58) Field of Classification Search .................. 264/403, 264/258, 319; 249/78, 79
See application file for complete search history.

(56) References Cited

U.S. PATENT DOCUMENTS

| | | | | |
|---|---|---|---|---|
| 1,910,015 | A * | 5/1933 | Homand | 249/187.1 |
| 2,106,614 | A * | 1/1938 | Lindner | 249/82 |
| 2,317,597 | A * | 4/1943 | Ford et al. | 425/407 |
| 5,599,472 | A * | 2/1997 | Brown et al. | 219/634 |
| 7,102,112 | B2 | 9/2006 | Anderson et al. | |
| 7,109,451 | B2 | 9/2006 | Brown et al. | |
| 2005/0035116 | A1* | 2/2005 | Brown et al. | 219/759 |
| 2007/0160822 | A1* | 7/2007 | Bristow et al. | 428/304.4 |

* cited by examiner

*Primary Examiner* — Christina Johnson
*Assistant Examiner* — Galen Hauth
(74) *Attorney, Agent, or Firm* — Tung & Associates

(57) ABSTRACT

A composite fabrication apparatus which may include a first tooling die and a second tooling die movable with respect to each other; a thermal control system having induction coils disposed in thermal contact with the first tooling die and the second tooling die; a first die susceptor provided on the first tooling die and a second die susceptor provided on the second tooling die and connected to the induction coils; and a cooling system disposed in thermal contact with the first tooling die and the second tooling die. A composite fabrication method is also disclosed.

15 Claims, 5 Drawing Sheets

COMPOSITE FABRICATION APPARATUS AND METHOD

TECHNICAL FIELD

The disclosure relates to composite fabrication apparatus and methods. More particularly, the disclosure relates to a composite fabrication apparatus and method which optimizes performance of a composite material fabricated according to the method.

BACKGROUND

Processing techniques and facilities which enable widespread use of molded thermoplastic composite components at production rates and production costs and that allow significant weight savings scenarios may be desirable in some applications. The capability to rapidly heat, consolidate and cool in a controlled manner may be required for high production rates of composite components. Current processing techniques include the use of heated dies, and therefore, may not allow for the optimum controlled cool-down which may be required for optimum fabrication. Furthermore, current processing techniques may have limitations in forming the desired components since such techniques have limitations in the capability to hold the dimensions of the component accurately or maintain the composite in a fully consolidated state and may not optimize performance of the current resin systems.

SUMMARY

The disclosure is generally directed to a composite fabrication apparatus. An illustrative embodiment of the composite fabrication apparatus may include a first tooling die and a second tooling die movable with respect to each other; a first contoured surface provided on the first tooling die and a second contoured surface provided on the second tooling die; a thermal control system having induction coils disposed in thermal contact with the first tooling die and the second tooling die; a first die susceptor provided on the first contoured surface of the first tooling die and a second die susceptor provided on the second contoured surface of the second tooling die and connected to the induction coils; and a cooling system disposed in thermal contact with the first tooling die and the second tooling die.

The disclosure is further generally directed to a composite fabrication method. An illustrative embodiment of the composite fabrication method includes providing a stacked tooling apparatus comprising a first tooling die and a second tooling die; placing molding compounds between the first tooling die and the second tooling die; heating the first tooling die and the second tooling die; moving the first tooling die and the second tooling die into contact with the composite sheet; cooling the first tooling die and the second tooling die; and removing a molded composite sheet from between the first tooling die and the second tooling die.

BRIEF DESCRIPTION OF THE ILLUSTRATIONS

DETAILED DESCRIPTION

Figure 1:
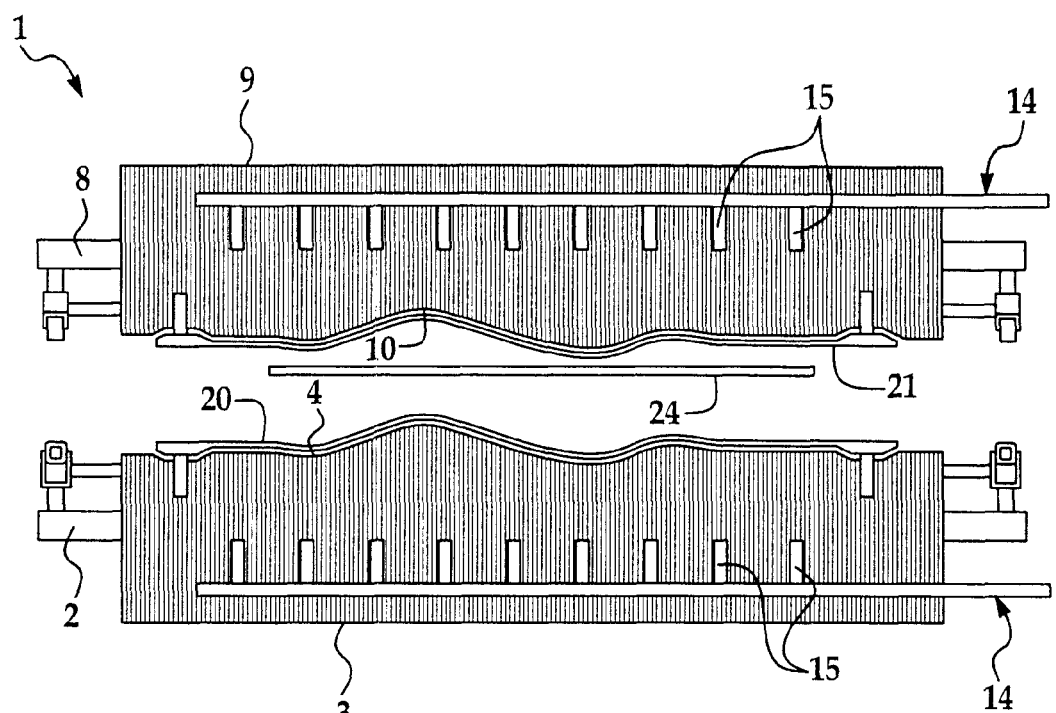
FIG. 1 is a sectional view of a pair of tooling dies of a stacked tooling apparatus, with molding compounds positioned between the tooling dies.

Referring initially to FIGS. 1-7 of the drawings, a stacked tooling apparatus which is suitable for implementation of the composite fabrication method is generally indicated by reference numeral 1. The stacked tooling apparatus 1 may include a first die frame 2 and a second die frame 8. A first tooling die 3 may be provided on the first die frame 2, and a second tooling die 9 may be provided on the second die frame 8. The first tooling die 3 and the second tooling die 9 may be hydraulically-actuated to facilitate movement of the first tooling die 3 and the second tooling die 9 toward and away from each other. The first tooling die 3 may have a first contoured die surface 4, whereas the second tooling die 9 may have a second contoured die surface 10 which is complementary to the first contoured die surface 4 of the first tooling die 3.

Figure 5:
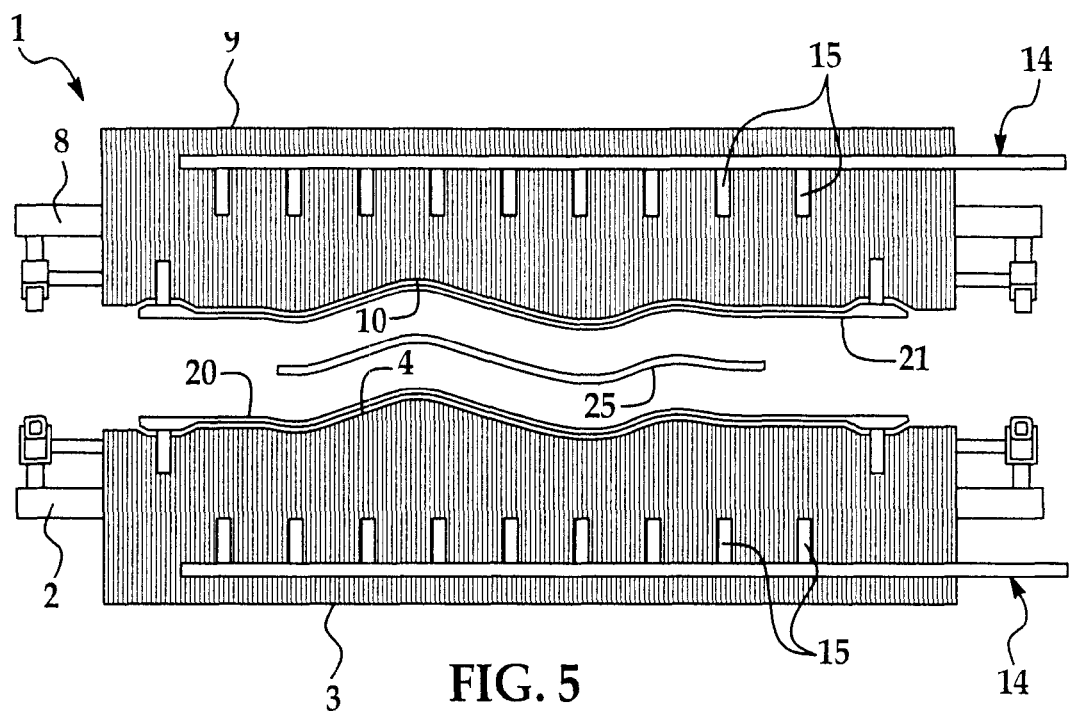
FIG. 5 is a sectional view of the tooling dies, with the tooling dies and die susceptors released from the composite sheet after forming and cooling of the composite sheet.
Figure 6:
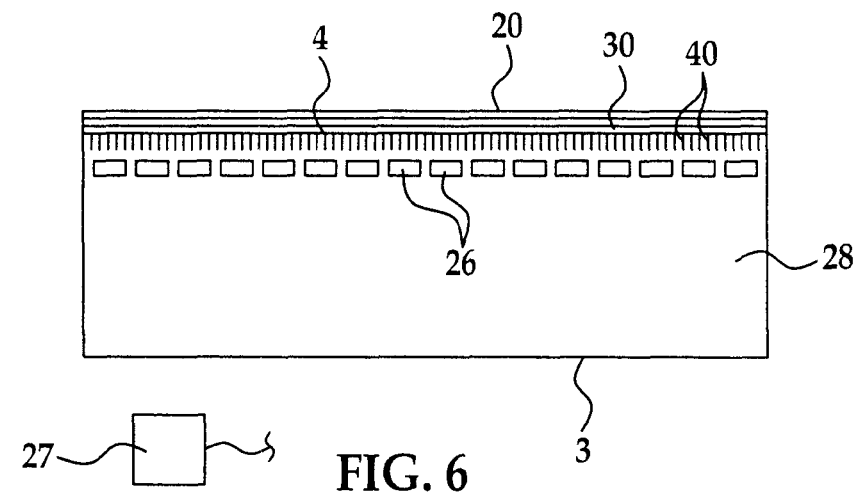
FIG. 6 is a schematic view of a tooling die, more particularly illustrating a die susceptor and die liner provided on the engaging surface of the tooling die and multiple induction coils extending through the tooling die.

As shown in FIG. 6, multiple induction coils 26 may extend through each of the first tooling die 3 (and the second tooling die 9, not shown) to facilitate selective heating of the first tooling die 3 and the second tooling die 9. A thermal control system 27 may be connected to the induction coils 26. A first die susceptor 20 may be thermally coupled to the induction coils 26 of the first tooling die 3. A second die susceptor 21 may be thermally coupled to the induction coils 26 of the second tooling die 9. Each of the first die susceptor 20 and the second die susceptor 21 may be a thermally-conductive material such as, but not limited to, a ferromagnetic material, cobalt, nickel, or compounds thereof. As shown in FIGS. 1-5, the first die susceptor 20 may generally conform to the first contoured die surface 4 and the second die susceptor 21 may generally conform to the second contoured die surface 10.

As shown in FIG. 6, an electrically and thermally insulative coating 30 may be provided on the first contoured die surface 4 of the first tooling die 3, as shown, and on the second contoured die surface 10 of the second tooling die 9 (not shown). The electrically and thermally insulative coating 30 may be, for example, alumina or silicon carbide. The first die susceptor 20 may be provided on the electrically and thermally insulative coating of the first tooling die 3, as shown, and the second die susceptor 21 may be provided on the electrically and thermally insulative coating 30 of the second tooling die 9 (not shown).

Figure 4:
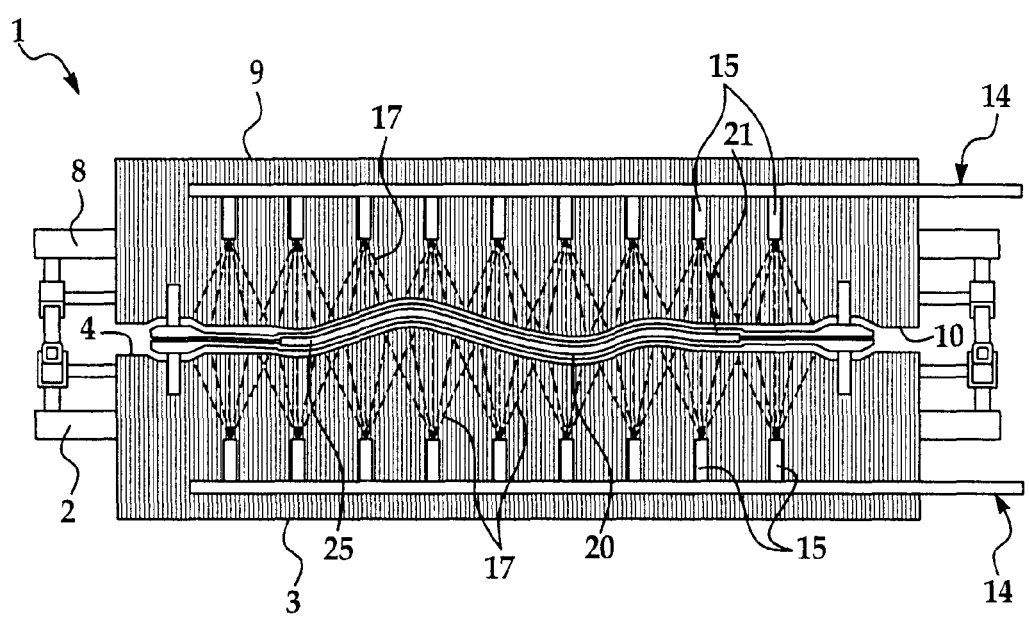
FIG. 4 is a sectional view of the tooling dies, with the tooling dies closed against the die susceptors and composite sheet and a cooling system engaged to cool the tooling dies.

As shown in FIGS. 1-5, a cooling system 14 may be provided in each of the first tooling die 3 and the second tooling die 9. The cooling system 14 may include, for example, coolant conduits 15 which have a selected distribution throughout each of the first tooling die 3 and the second tooling die 9. As shown in FIG. 4, the coolant conduit 15 may be adapted to discharge a cooling medium 17 into the first tooling die 3 or the second tooling die 9. The cooling medium 17 may be a liquid, gas or gas/liquid mixture which may be applied as a mist or aerosol, for example.

Figure 7:
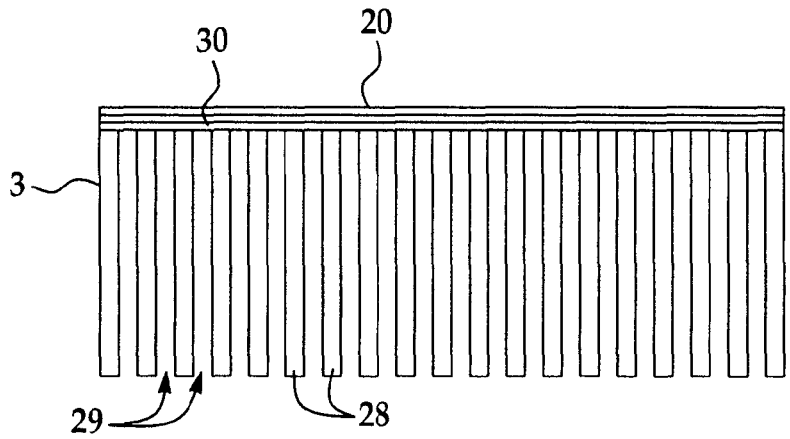
FIG. 7 is a front sectional view of a tooling die, more particularly illustrating multiple induction coils and multiple thermal expansion slots provided in the metal sheet.

Each of the first tooling die 3 and the second tooling die 9 may each include multiple stacked metal sheets 28 such as stainless steel which are trimmed to the appropriate dimensions for the induction coils 26. This is shown in FIGS. 6 and 7. The stacked metal sheets 28 may be oriented in generally perpendicular relationship with respect to the first contoured die surface 4 and the second contoured die surface 10. Each metal sheet 28 may have a thickness of from about $1/16''$ to about $1/2''$, for example and preferably $1/8''$. An air gap 29 may be provided between adjacent stacked metal sheets 28 to facilitate cooling of the first tooling die 3 and the second tooling die 9 (not shown). The stacked metal sheets 28 may be attached to each other using clamps (not shown), fasteners (not shown) and/or other suitable technique known to those skilled in the art. The stacked metal sheets 28 may be selected based on their electrical and thermal properties and may be transparent to the magnetic field. An electrically insulating coating (not shown) may, optionally, be provided on each side of each stacked sheet 28 to prevent flow of electrical current between the stacked metal sheets 28. The insulating coating may be a material such as ceramic, for example, or other high temperature resistant materials. However, if an air gap exists inbetween the stacked sheets, then no coating would be necessary. Multiple thermal expansion slots 40 may be provided in each stacked sheet 28, as shown in FIG. 6, to facilitate thermal expansion and contraction of the stacked tooling apparatus 1.

Figure 2:
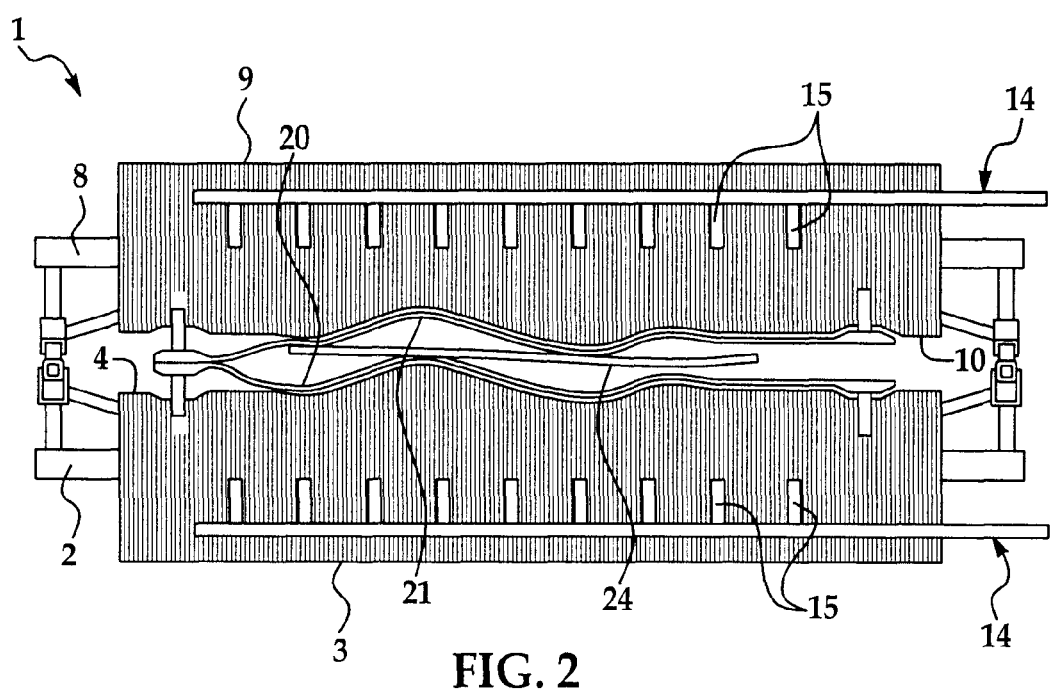
FIG. 2 is a sectional view of a pair of tooling dies, with the molding compounds enclosed between a pair of die susceptors provided on the tooling dies.
Figure 3:
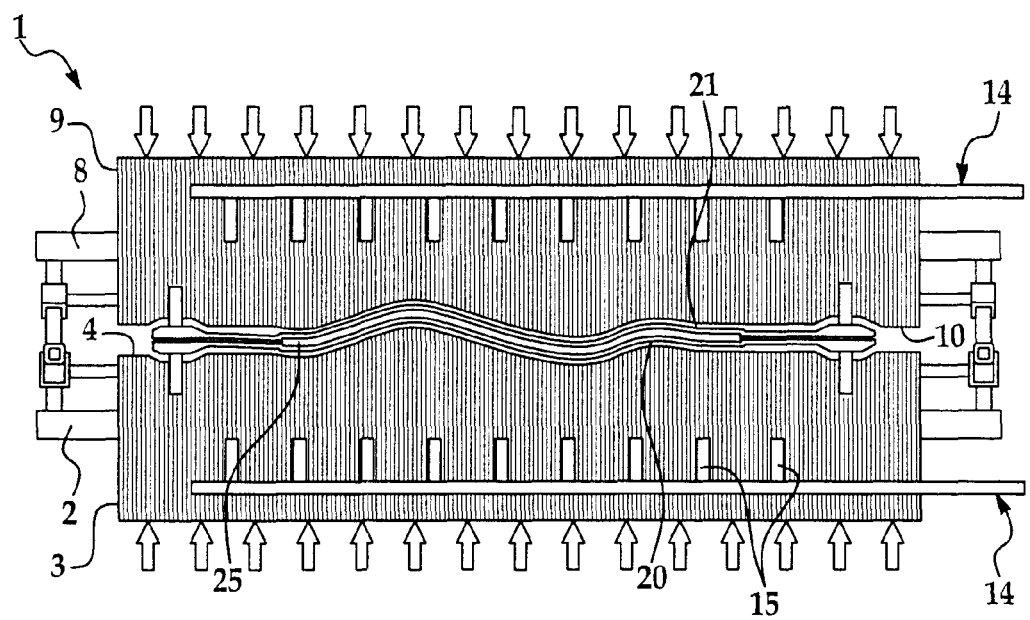
FIG. 3 is a sectional view of the tooling dies, with the tooling dies applying pressure to form and consolidate a composite sheet.

In typical implementation of the composite fabrication method, molding compounds 24 are initially positioned between the first tooling die 3 and the second tooling die 9 of the stacked tooling apparatus 1, as shown in FIG. 1. The first tooling die 3 and the second tooling die 9 are next moved toward each other, as shown in FIG. 2, as the induction coils 26 (FIG. 6) heat the first tooling die 3 and the second tooling die 9 as well as the first die susceptor 20 and the second die susceptor 21. Therefore, as the first tooling die 3 and the second tooling die 9 close toward each other, the first die susceptor 20 and the second die susceptor 21 rapidly heat the molding compounds 24. Thus, the molding compounds 24 which may be thermally molded as the first tooling die 3 and the second tooling die 9 continue to approach and then close against the molding compounds 24, as shown in FIG. 2, forming the molding compounds 24 to the configuration of a composite sheet 25 (shown in FIGS. 3-5) which may be defined by the first contoured surface 4 of the first tooling die 3 and the second contoured surface 10 of the second tooling die 9.

As shown in FIG. 4, the cooling system 14 is next operated to apply the cooling medium 17 to the first tooling die 3 and the second tooling die 9 and to the first die susceptor 20 and the second die susceptor 21. Therefore, the cooling medium 17 actively and rapidly cools the first tooling die 3 and the second tooling die 9 as well as the first die susceptor 20 and the second die susceptor 21, also cooling the composite sheet 25 sandwiched between the first die susceptor 20 and the second die susceptor 21. The composite sheet 25 remains sandwiched between the first tooling die 3 and the second tooling die 9 for a predetermined period of time until complete cooling of the composite sheet 25 has occurred. This allows the molded and consolidated composite sheet 25 to retain the structural shape which is defined by the first contoured surface 4 and the second contoured surface 10 after the first tooling die 3 and the second tooling die 9 are opened, as shown in FIG. 5. The formed and cooled composite sheet 25 is removed from the stacked tooling apparatus 1 without loss of dimensional accuracy or delamination of the composite sheet 25 when it is cooled at an appropriate property-enhancing rate.

Figure 8:
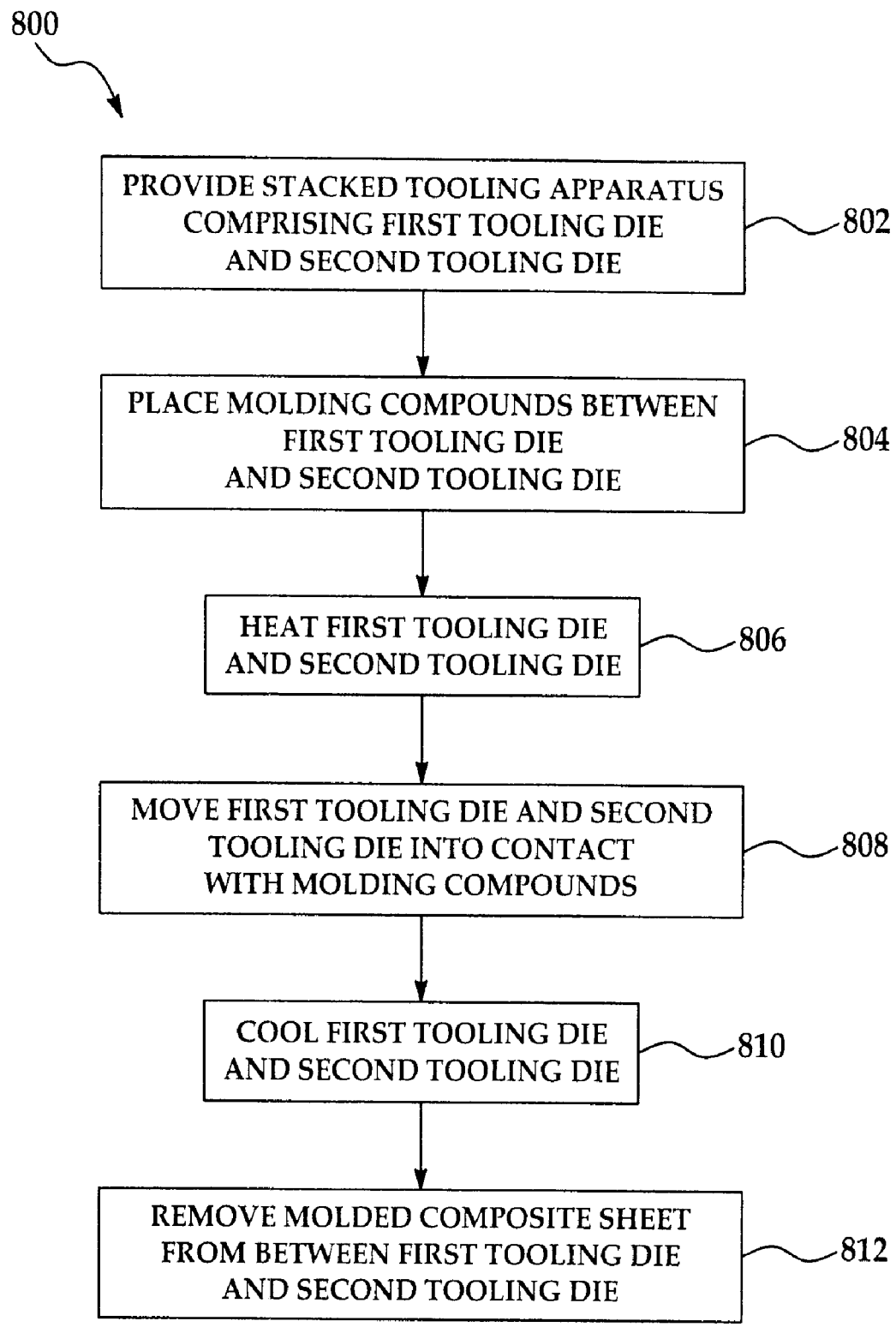
FIG. 8 is a flow diagram which illustrates an exemplary composite fabrication method.

Referring next to FIG. 8, a block diagram 800 which illustrates an exemplary composite fabrication method is shown. In block 802, a stacked tooling apparatus comprising a first tooling die and a second tooling die may be provided. In block 804, molding compounds may be placed between the first tooling die and the second tooling die. In block 806, the first tooling die and the second tooling die may be heated. In block 808, the first tooling die and the second tooling die may be moved into contact with the molding compounds. In block 810, the first tooling die and the second tooling die may be cooled. In block 812, a molded composite sheet is removed from between the first tooling die and the second tooling die.

Figure 9:
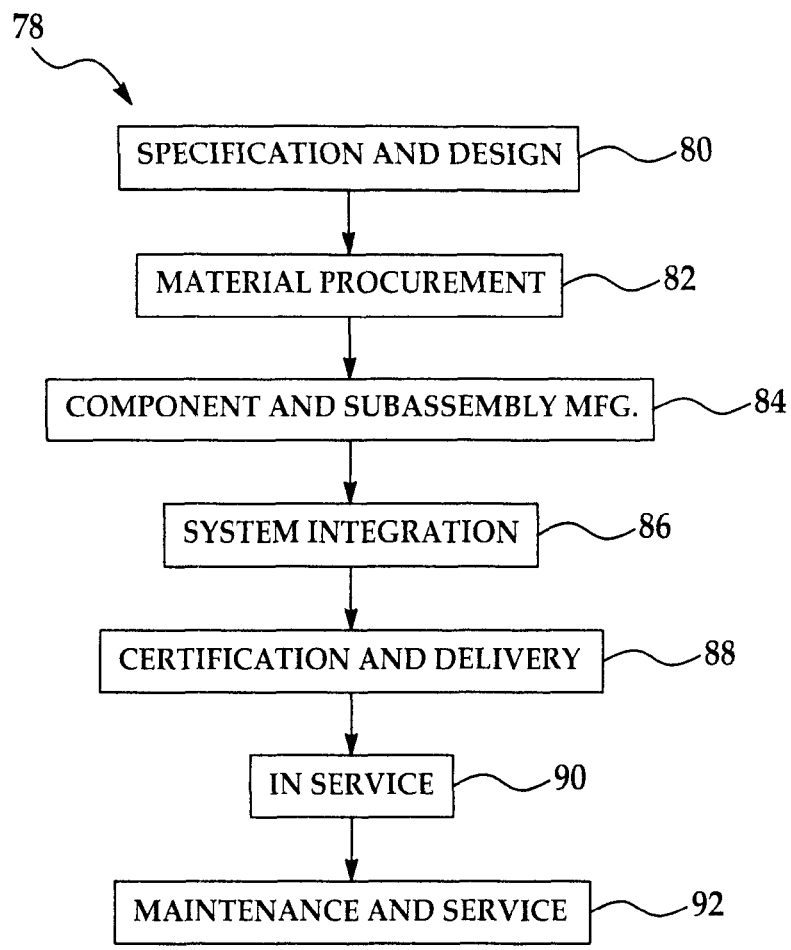
FIG. 9 is a flow diagram of an aircraft production and service methodology.
Figure 10:
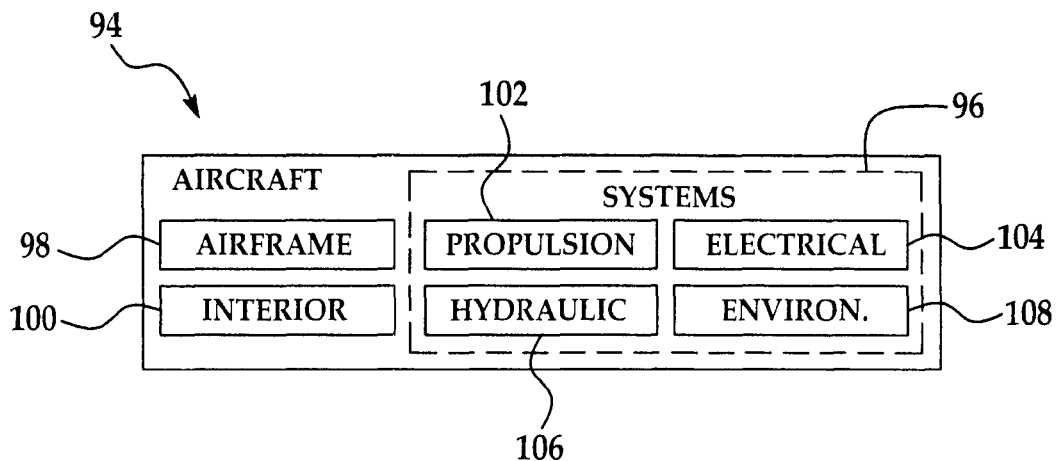
FIG. 10 is a block diagram of an aircraft.

Referring next to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite fabrication method, comprising:
    forming a stacked tooling apparatus comprising a first tooling die and a second tooling die each formed by a plurality of stacked metal sheets, each of said plurality of stacked metal sheets is oriented in generally perpendicular relationship with respect to a first die surface comprising a first die susceptor and a second die surface comprising a second die susceptor;
    placing molding compounds comprising a composite sheet between said first tooling die and said second tooling die;
    positioning said first die susceptor on said first tooling die and said second die susceptor on said second tooling die;
    heating said first tooling die and said second tooling die with said first and second die susceptors in respective contact with said first tooling die and said second tooling die;
    moving said first tooling die and said second tooling die toward each other into contact with said molding compounds while holding said molding compounds substantially stationary to form said molding compounds into a shape defined by said first and second die surfaces, and;
    cooling said first tooling die and said second tooling die.

2. The method of claim 1 wherein said step of cooling said first tooling die and said second tooling die comprises discharging a cooling medium into said first tooling die and said second tooling die.

3. The method of claim 2 wherein said cooling medium is a liquid, gas or gas/liquid mixture.

4. The method of claim 1 further comprising:
    providing induction coils in each of said first tooling die and said second tooling die; and
    heating said first tooling die and said second tooling die via said first and second susceptors by energizing said induction coils.

5. The method of claim 1 wherein said step of cooling said first tooling die and said second tooling die further comprises:
    providing a plurality of coolant conduits in each of said first tooling die and said second tooling die; and
    discharging a cooling medium through said plurality of coolant conduits and'into said first tooling die and said second tooling die.

6. The method of claim 1 further comprising the step of providing a plurality of air gaps with each between two of said plurality of stacked metal sheets.

7. The method of claim 1 further comprising the step of providing a plurality of thermal expansion slots in each of said plurality of stacked metal sheets.

8. A laminated tooling composite fabrication method, comprising:
    providing a tooling apparatus formed of stacked metal sheets and comprising a first tooling die having a first contoured die surface and a second tooling die having a second contoured die surface, said first and second contoured die surfaces comprising respective first and second die susceptors, each of said plurality of stacked metal sheets is oriented in generally perpendicular relationship with respect to said first contoured die surface comprising said first die susceptor and said second contoured die surface comprising said second die susceptor;
    placing molding compounds between said first tooling die and said second tooling die;
    heating said first tooling die and said second tooling die with induction coils in respective thermal contact with said first tooling die and said second tooling die;
    moving said first contoured die surface of said first tooling die and said second contoured die surface of said second tooling die toward each other into contact with said molding compounds while holding said molding compounds substantially stationary to form said molding compounds into a shape defined by said first and second contoured die surfaces, said moving said first and second contoured surfaces including said respective first and second die susceptors;
    cooling said first tooling die and said second tooling die; and
    removing a molded composite sheet from between said first contoured die surface of said first tooling die and said second contoured die surface of said second tooling die.

9. The method of claim 8 wherein said step of cooling said first tooling die and said second tooling die comprises discharging a cooling medium into said first tooling die and said second tooling die.

10. The method of claim 9 wherein said cooling medium is a liquid, gas or gas/liquid mixture.

11. The method of claim 8 further comprising:
    providing induction coils in each of said first tooling die and said second tooling die; and
    heating said first tooling die and said second tooling die by energizing said induction coils.

12. The method of claim 8 wherein said step of cooling said first tooling die and said second tooling die further comprises:
    providing a plurality of coolant conduits in each of said first tooling die and said second tooling die; and
    discharging a cooling medium through said plurality of coolant conduits and into said first tooling die and said second tooling die.

13. The method of claim 8 further comprising the step of providing a plurality of air gaps with each between two of said plurality of stacked metal sheets.

14. The method of claim 8 further comprising the step of providing a plurality of thermal expansion slots in each of said plurality of stacked metal sheets.

15. A laminated tooling composite fabrication method with active die cooling, comprising:
    providing a stacked tooling apparatus comprising:
        a first tooling die having a first plurality of stacked metal sheets, a first plurality of air gaps between said first plurality of stacked metal sheets, a first plurality of thermal expansion slots provided in each of said first plurality of stacked metal sheets, a first contoured die surface oriented in generally perpendicular relationship with respect to said first plurality of stacked metal sheets, a first plurality of induction coils in said first plurality of stacked metal sheets, a first die susceptor on said first contoured die surface and a first plurality of coolant conduits provided in said first plurality of stacked metal sheets;
        a second tooling die having a second plurality of stacked metal sheets, a second plurality of air gaps between said second plurality of stacked metal sheets, a second plurality of thermal expansion slots provided in each of said second plurality of stacked metal sheets, a second contoured die surface oriented in generally perpendicular relationship with respect to said second plurality of stacked metal sheets, a second plurality of induction coils in said second plurality of stacked metal sheets, a second die susceptor on said second contoured die surface and a second plurality of coolant conduits provided in said second plurality of stacked metal sheets;

placing molding compounds between said first contoured surface of said first tooling die and said second contoured surface of said second tooling die;

heating said first die susceptor of said first tooling die by energizing said first plurality of induction coils;

heating said second die susceptor of said second tooling die by energizing said second plurality of induction coils;

moving said first contoured die surface of said first tooling die and said second contoured die surface of said second tooling die toward each other into contact with said molding compounds while holding said molding compounds substantially stationary to form said molding compounds into a shape defined by said first and second contoured die surfaces, said moving said first and second die susceptors including said respective first and second contoured die surfaces;

cooling said first tooling die by discharging a cooling medium through said first plurality of coolant conduits and into said first tooling die;

cooling said second cooling die by discharging a cooling medium through said second plurality of coolant conduits and into said second tooling die; and removing a molded composite sheet from between said first contoured die surface of said first tooling die and said second contoured die surface of said second tooling die.

* * * * *